United States Patent
Agarwala et al.

(10) Patent No.: US 6,985,982 B2
(45) Date of Patent: Jan. 10, 2006

(54) ACTIVE PORTS IN A TRANSFER CONTROLLER WITH HUB AND PORTS

(75) Inventors: Sanjive Agarwala, Richardson, TX (US); David A. Comisky, St. Charles, IL (US); Charles Fuoco, Allen, TX (US); Raguram Damodaran, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 547 days.

(21) Appl. No.: 10/003,856

(22) Filed: Oct. 24, 2001

(65) Prior Publication Data

US 2002/0078269 A1 Jun. 20, 2002

Related U.S. Application Data

(60) Provisional application No. 60/243,933, filed on Oct. 27, 2000.

(51) Int. Cl.
*G06F 13/00* (2006.01)

(52) U.S. Cl. .......................... 710/112; 710/263; 710/39

(58) Field of Classification Search ................ 710/305, 710/310, 22, 112, 39, 100, 263, 260–266
See application file for complete search history.

(56) References Cited

U.S. PATENT DOCUMENTS 6,496,740 B1 * 12/2002 Robertson et al. ............ 700/20
6,662,306 B2 * 12/2003 Van Loo ...................... 713/600

* cited by examiner

*Primary Examiner*—Rehana Perveen
*Assistant Examiner*—Kim T. Huynh
(74) *Attorney, Agent, or Firm*—Robert D. Marshall, Jr.; W. James Brady, III; Frederick J. Telecky, Jr.

(57) ABSTRACT

In a transfer controller with hub and ports architecture one of the data ports is an active data port. This active data port can supply its own source information, destination information and data quantity in a data transfer request. This data transfer request is serviced in a manner similar to other data transfer requests. The active data port may specify itself as the data destination in an active read. Alternatively, the active data port may specify itself as the data source in an active data write.

15 Claims, 6 Drawing Sheets

ACTIVE PORTS IN A TRANSFER CONTROLLER WITH HUB AND PORTS

This application claims priority under 35 U.S.C. §119 (e)(1) from U.S. Provisional Application No. 60/243,933 filed Oct. 27, 2000.

BACKGROUND OF THE INVENTION

Direct memory access (DMA) controllers are heavily utilized in the field of digital signal processing (DSP). Such controllers can provide enhanced system performance by off loading the task of real-time data transactions from the central processing unit (CPU). The transfer controller with hub and ports architecture (TCHP) described in U.K. Patent Application No. 9901996.9 filed Apr. 10, 1999 entitled TRANSFER CONTROLLER WITH HUB AND PORTS ARCHITECTURE, having a convention application now U.S. Pat. No. 6,496,740, provides flexibility and performance above and beyond that of previous DMA implementations through increased parallelism, pipelining, and improved hardware architecture.

Despite their flexibility and improved system performance, all DMA controllers face a common problem. Because DMAs are fundamentally architected to perform memory transactions, the sharing of any addressable resource with another controller poses a significant challenge to system design. Historically, this has been addressed either by multiple porting of such addressable resources, or through arbitration schemes, ranging from the very simple to the very complex.

Multiple porting of memory is the simplest method of supporting access by two or more bus masters, such as a DMA controller and a CPU. While simple, the cost paid for such porting is both physical area, as multi-ported memories are larger than their equivalent single-ported counterparts, and performance, as such porting enforces increased latency on accesses, thus reducing the maximum access rate.

Arbitration for a single-ported addressable resource also has its pitfalls. If the number of masters in the system becomes very large, the arbitration scheme will typically become either very complex or very inefficient. Furthermore, with a large number of requesters of a resource, requesters on the lowest of the prioritization levels may often be blocked out for long periods of time trying to gain access to the resource.

At the direct memory access (DMA) level, there are additional challenges in supporting sharing of resources with a mastering peripheral. Since the DMA typically wishes to master its own accesses, peripherals may not freely push data into or out of the DMA or addressable resources that the DMA accesses. To account for delays in arbitration that may be present, such peripherals often must incur an overhead of buffering, and often a complex handshaking scheme must be adopted to ensure that no data is lost.

To further complicate matters, it is often necessary to verify many boundary conditions to ensure that various memory ports and peripherals do not get into a state of lockup. A classic example of this is when a peripheral tries to push data out of its boundary and into a destination, while at the same time the destination is being read by the DMA. Since the read by the DMA cannot complete, the interface must stall. However, if the interface stalls the reads will never complete and thus the system locks up.

One approach to such issues that has been implemented in various DMA designs has been the inclusion of a separate port for mastering controllers, which allows the controller to directly access registers of the addressing machines of the DMA. Including such a port greatly reduces the complexity of the system, because once the addressing machines of the DMA are loaded, the accesses performed look like any other DMA access. Hence, whatever arbitration scheme exists within the DMA or for shared resources outside of the DMA (for example, between the DMA and a CPU) will suffice for this access type as well. Thus, support for access to addressable resources by a controller other than the DMA can be provided without having to add additional ports or arbitration to each resource.

The early direct memory access has evolved into several successive versions of centralized transfer controllers and more recently into the transfer controller with hub and ports architecture. The transfer controller with hub and ports architecture is described in U.K. Patent Application No. 9901996.9 filed Apr. 10, 1999 entitled TRANSFER CONTROLLER WITH HUB AND PORTS ARCHITECTURE, having a convention application now U.S. Pat. No. 6,496,740.

A first transfer controller module was developed for the TMS320C80 digital signal processor from Texas Instruments. The transfer controller consolidated the direct memory access function of a conventional controller along with the address generation logic required for servicing cache and long distance data transfer, also called direct external access, from four digital signal processors and a single RISC (reduced instruction set computer) processor.

The transfer controller architecture of the TMS320C80 is fundamentally different from a direct memory access in that only a single set of address generation and parameter registers is required. Prior direct memory access units required multiple sets for multiple channels. The single set of registers, however, can be utilized by all direct memory access requesters. Direct memory access requests are posted to the transfer controller via set of encoded inputs at the periphery of the device. Additionally, each of the digital signal processors can submit requests to the transfer controller. The external encoded inputs are called "externally initiated packet transfers" (XPTs). The digital signal processor initiated transfers are referred to as "packet transfers" (PTs). The RISC processor could also submit packet transfer requests to the transfer controller.

The transfer controller with hub and ports introduced several new concepts. The first was uniform pipelining. New digital signal processor devices containing a transfer controller with hub and ports architecture have multiple external ports, all of which look identical to the hub. Thus peripherals and memory may be freely interchanged without affecting the hub. The second new idea is the concept of concurrent execution of transfers. That is, up to N transfers may occur in parallel on the multiple ports of the device, where N is the number of channels in the transfer controller with hub and ports core. Each channel in the transfer controller with hub and ports core is functionally just a set of registers. This set of registers tracks the current source and destination addresses, the word counts and other parameters for the transfer. Each channel is identical, and thus the number of channels supported by the transfer controller with hub and ports is highly scalable.

Finally the transfer controller with hub and ports includes a mechanism for queuing transfers up in a dedicated queue memory. The TMS320C80 transfer controller permitted only was one transfer outstanding per processor at a time. Through the queue memory provided by the transfer controller with hub and ports, processors may issue numerous transfer requests up to the queue memory size before stalling the digital signal processor.

The present invention deals with the data transfer connecting various memory port nodes as applied to the transfer controller with hub and ports, which is the subject of U.K. Patent Application No. 9909196.9 filed Apr. 10, 1999, having a convention application now U.S. Pat. No. 6,496,740. The transfer controller with hub and ports is a significant basic improvement in data transfer techniques in complex digital systems and provides many useful features, one of which is the internal memory port which allows connection of a virtually unlimited number of processor/memory nodes to a centralized transfer controller. The centralized transfer controller must be able to transfer data from node to node with performance relatively independent of how near or remote a node might be from the transfer controller itself. To clarify the problem solved by the present invention, it is helpful to review the characteristics, architecture, and functional building blocks of the transfer controller with hub and ports.

SUMMARY OF THE INVENTION

An active port is a peripheral or controller device that supplies its own source and destination addresses for each transaction that it performs. An example of an active port in a DSP application might be an integrated PCI controller. On one side of the interface would be a standard PCI connection, which may be part of a larger system including other back plane devices or perhaps a host central processing unit (CPU). On the other side of the interface, internal to the device, is an interface within a transfer controller with hub and ports which converts PCI read and write commands into device read and write commands.

There are two types of transfers that must be considered: an active read and an active write. Reads and writes are described here in the context of a device outside of the target device. That is, an active write is a write from the active port to the system memory space. An active read is a read of the system memory space by the active port.

An active write, in its simplest form, exists as follows in the transfer controller with hub and ports. An address is first written into the active port. This usually occurs from the device pins. Provisions allowing the CPU to source this are helpful for eliminating lockup conditions. The address for an active write specifies the final destination for data that is to be written into the system through the active port. When data written to the active port, it must be temporarily held in a storage facility, while a request is posted to the transfer controller with hub and ports to move the data to its final destination.

An active read command again starts with an address write to the active port. This is typically done from the device pins. It is considered necessary and desirable to allow the CPU similar loading capabilities. This address represents the address for the source data within the system memory space. In an active read, a transfer request is posted to the transfer controller with hub and ports before any data sub-cycles are performed. Note that this was not the case for active writes.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
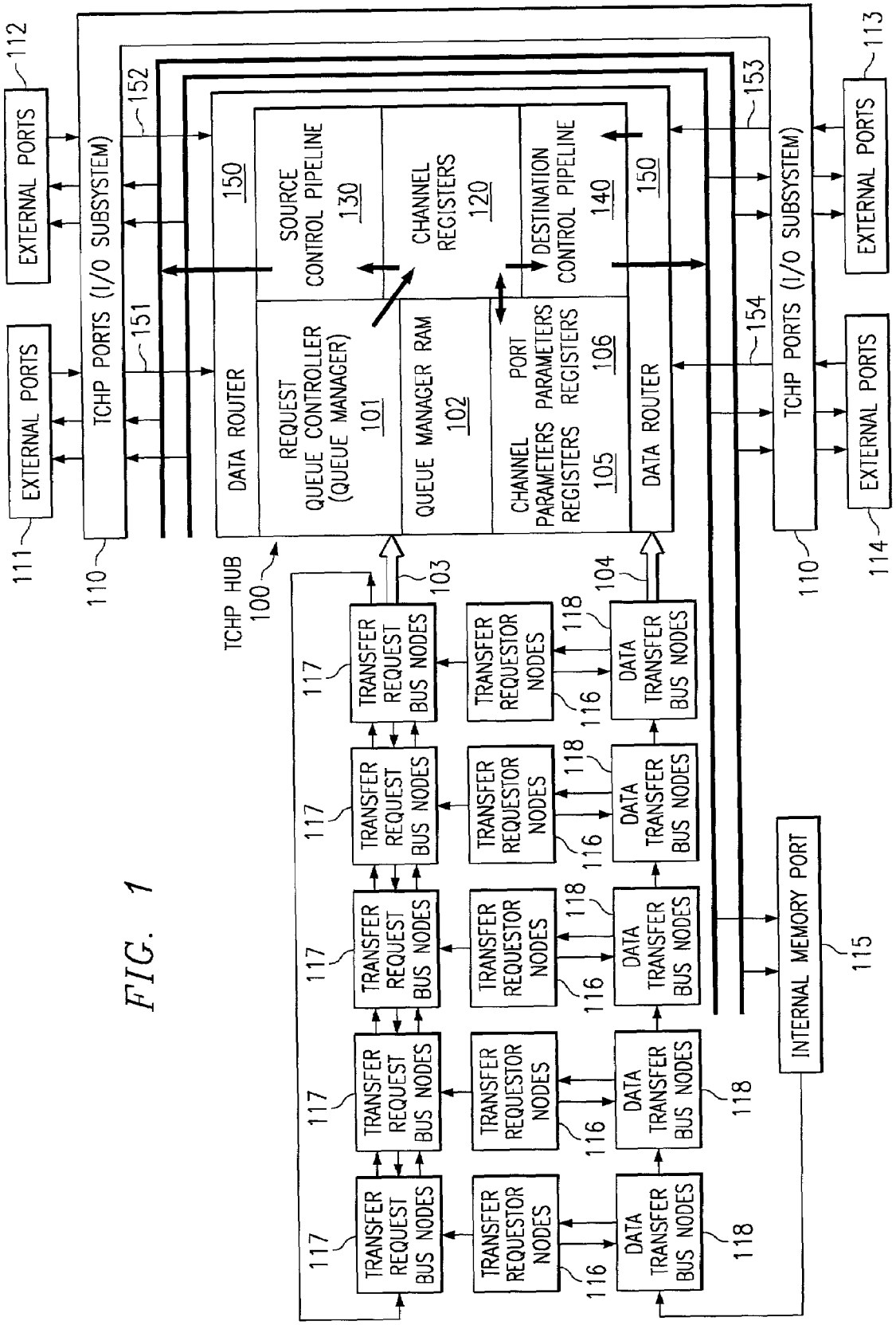
FIG. 1 illustrates in a functional block diagram the basic principal features of the transfer controller with hub and ports architecture and related functions.

The transfer controller with hub and ports transfer controller with hub and ports architecture is optimized for efficient passage of data throughout a digital signal processor chip. FIG. 1 illustrates a block diagram of the principal features of the transfer controller with hub and ports. It consists of a system of a single hub 100 and multiple ports 111 through 115. At the heart of the hub is the transfer controller with hub and ports hub control unit 109 which acts upon request and status information to direct the overall actions of the transfer controller.

The transfer controller with hub and ports functions in conjunction with a transfer request bus having a set of nodes 117, which bring in transfer request packets at input 103. These transfer request bus nodes individually receive transfer requests packets from transfer requesters 116 which are processor-memory nodes or other on-chip functions which send and receive data.

Secondly, the transfer controller uses an additional bus, the data transfer bus having a set of nodes 118, to read or write the actual data at the requester nodes 116. The data transfer bus carries commands, write data and read data from a special internal memory port 115 and returns read data to the transfer controller hub via the data router 150 at inputs 104.

The transfer controller has, at its front-end portion, a request queue manager 101 receiving transfer requests in the form of transfer request packets at its input 103. Request queue manager 101 prioritizes, stores and dispatches these as required.

Request queue manager 101 connects within the transfer controller hub unit 100 to the channel request registers 120 which receive the data transfer request packets and process them. In this process, request queue manager 101 first prioritizes the transfer request packets and assigns them to one of the N channel request registers 120. Each of the N channel request registers 120 represents a priority level.

If there is no channel available for direct processing of the transfer request packet, it is stored in the queue manager memory 102. Queue manager memory 102 is preferably a random access memory (RAM). The transfer request packet is then assigned at a later time when a channel becomes available. The channel registers interface with the source 130 and destination 140 control pipelines which effectively are address calculation units for source (read) and destination (write) operations.

Outputs from these pipelines are broadcast to M ports through the transfer controller ports I/O subsystem 110. I/O subsystem 110 includes a set of hub interface units, which drive the M possible external ports units. Four such external ports are shown in FIG. 1 as external ports 111 through 114. The external ports units (also referred to as application units) are clocked either at the main processor clock frequency or at a different external device clock frequency. The external device clock frequency may be lower than or higher than the main processor clock frequency. If a port operates at its own frequency, synchronization to the core clock is required.

As an example of read-write operations at the ports, consider a read from external port node 112 followed by a write to external port node 114. First the source pipeline addresses port 112 for a read. The data is returned to the transfer controller hub through the data router unit 150. On a later cycle the destination control pipeline addresses port 114 and writes the data at port 114. External ports as described here do not initiate transfer requests but merely participate in reads and writes requested elsewhere on the chip. Read and write operations involving the processor-memory (transfer requesters) nodes 116 are initiated as transfer request packets on the transfer request bus 117. The queue manager 101 processes these as described above. On a later cycle a source pipeline output (read command/address) is generated which is passed at the internal memory port to the data transfer bus 118 in the form of a read. This command proceeds from one node to the next in pipeline fashion on the data transfer bus. When the processor node addressed is reached, the read request causes the processor-memory node to place the read data on the bus for return to the data router 150. On a later cycle, a destination pipeline output passes the corresponding write command and data to the internal memory port and on to the data transfer bus for writing at the addressed processor node.

The channel parameter registers 105 and port parameters registers 106 hold all the necessary parametric data as well as status information for the transfer controller hub pipelines to process the given transfer. Both pipelines share some of the stored information. Other portions relate specifically to one pipeline or the other.

Figure 2:
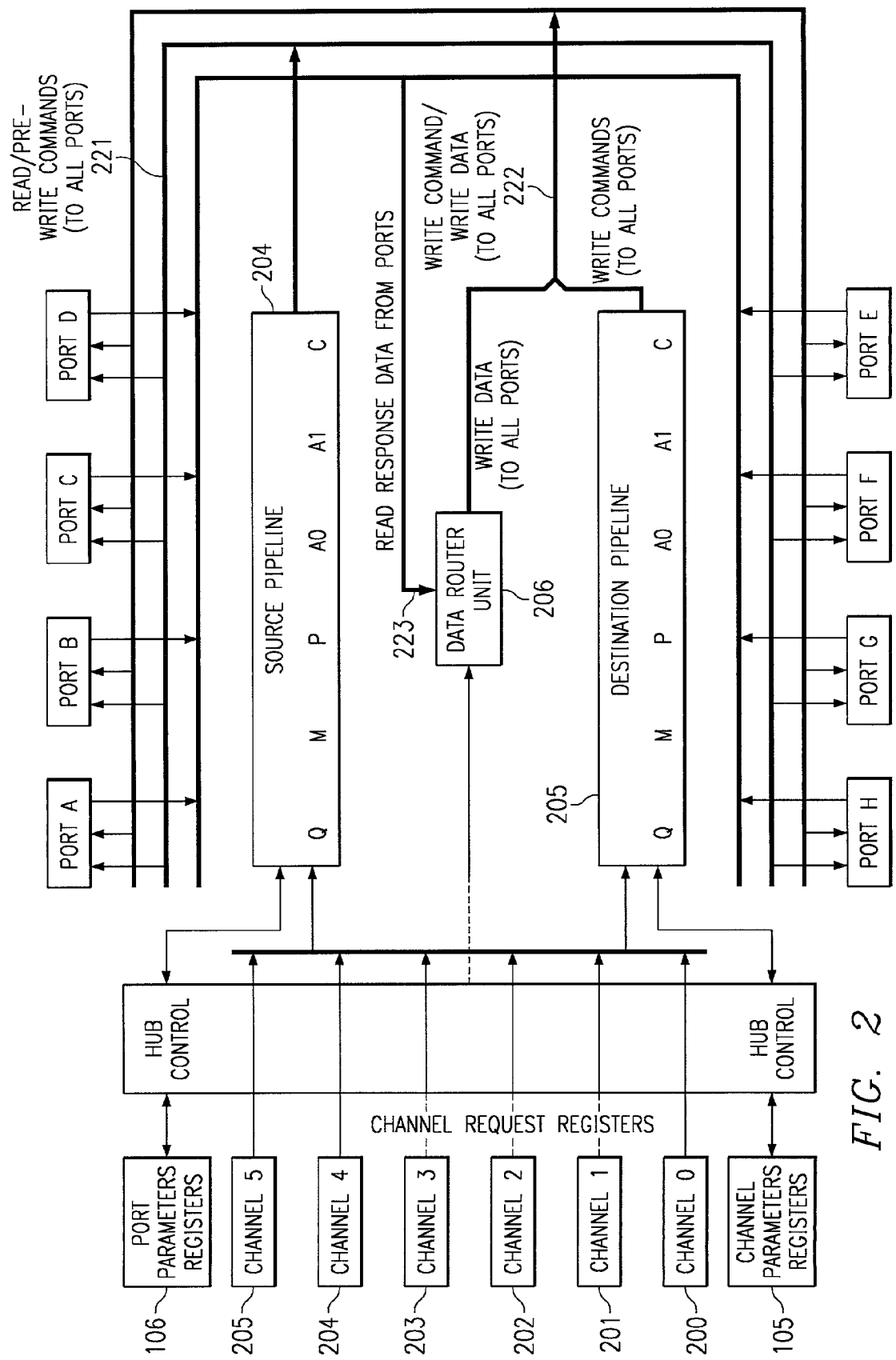
FIG. 2 illustrates the channel request registers interface to the transfer controller hub unit pipeline stages and external ports.

FIG. 2 illustrates the interface to the transfer controller hub unit boundary and particularly channel request registers 200 to 205, channel parameter registers 105 and port parameter registers 106. The channel parameters registers 105 and port parameters registers 106 store critical data regarding for example, types of transfers, mode information, status, and much other information critical to the transfer process.

The channel request registers pass information used in the source pipeline 204 for generation of the read/pre-write commands 221. Similarly the channel request registers pass information used in the destination pipeline 205 for the generation of write command/write data words 222. Read response data 223 from the ports is returned to the destination pipeline via the data router unit 206.

FIG. 2 also illustrates the possible pipelines in a transfer controller implementation. In specific implementations, one or more stages may be combined but the tasks which must be completed within the individual pipeline stages are essentially as follows.

TABLE 1

| Pipeline Stage | Function |
|---|---|
| Q | Interrogates the state of the queues within the ports |
| M | Map port ready signals to channels |
| P | Prioritize highest priority channel whose ports are ready |
| A0 | First half of address update cycle |
| A1 | Second half of address update cycle |
| C | Issue command to ports |

The transfer controller hub can perform two operations on ports on any given clock cycle. These two operations are a pre-write or a read at the source pipeline output stage and a write at the destination pipeline output stage. These two operations could occur at once at a single port. The read queue of the same port could also be exporting to the data router a word of 'read' data from a previous cycle. Hence, a single port may have as many as three operations on a given clock cycle. On a single clock cycle, source and destination pipelines having a depth of N each have an operation at their output stages and an additional N-1 operations passing through the first N-1 stages. For a six stage pipeline, for example, twelve total operations are in process. There can be one transaction in process at each A0, A1, and C stage of both the source and destination pipelines. The transactions in each stage of the source pipeline can be either read or pre-write, in any combination, whereas the destination pipeline can only process writes.

As described in U.K. Patent Application No. 9901996.9 filed Apr. 10, 1999 entitled TRANSFER CONTROLLER WITH HUB AND PORTS ARCHITECTURE, having a convention application now U.S. Pat. No. 6,496,740, the transfer controller with hub and ports includes several facilities that simplify the connection of active ports. There are two main facilities to be discussed, the hub interface unit (HIU) and transfer request (TR) bus.

The HIU mechanism generically performs data buffering for ports in a more traditional manner for ports that are not active. For example, and external memory interface typically does not attempt to master addresses within the DSP system. Rather, such a peripheral typically just responds to normal read and write commands from the transfer controller with hub and ports.

The HIU mechanism provides buffering for data and command in such instances. This allows a higher level of performance by performing accesses as burst transactions. That is, an HIU will typically include buffering for groups of datum, rather than single elements. This allows a single transfer controller with hub and ports command to be issued for multiple pieces of data. As memory technology, particularly dynamic RAM commonly used in DSP applications, has progressed, it has become increasingly important to perform multiple accesses such as this to combat the lost performance mandated by the latency of an access. This has additionally become a requirement due to the physics of semiconductors, which often will not allow propagation of signals across even a small part of a device in a single machine cycle.

Figure 3:
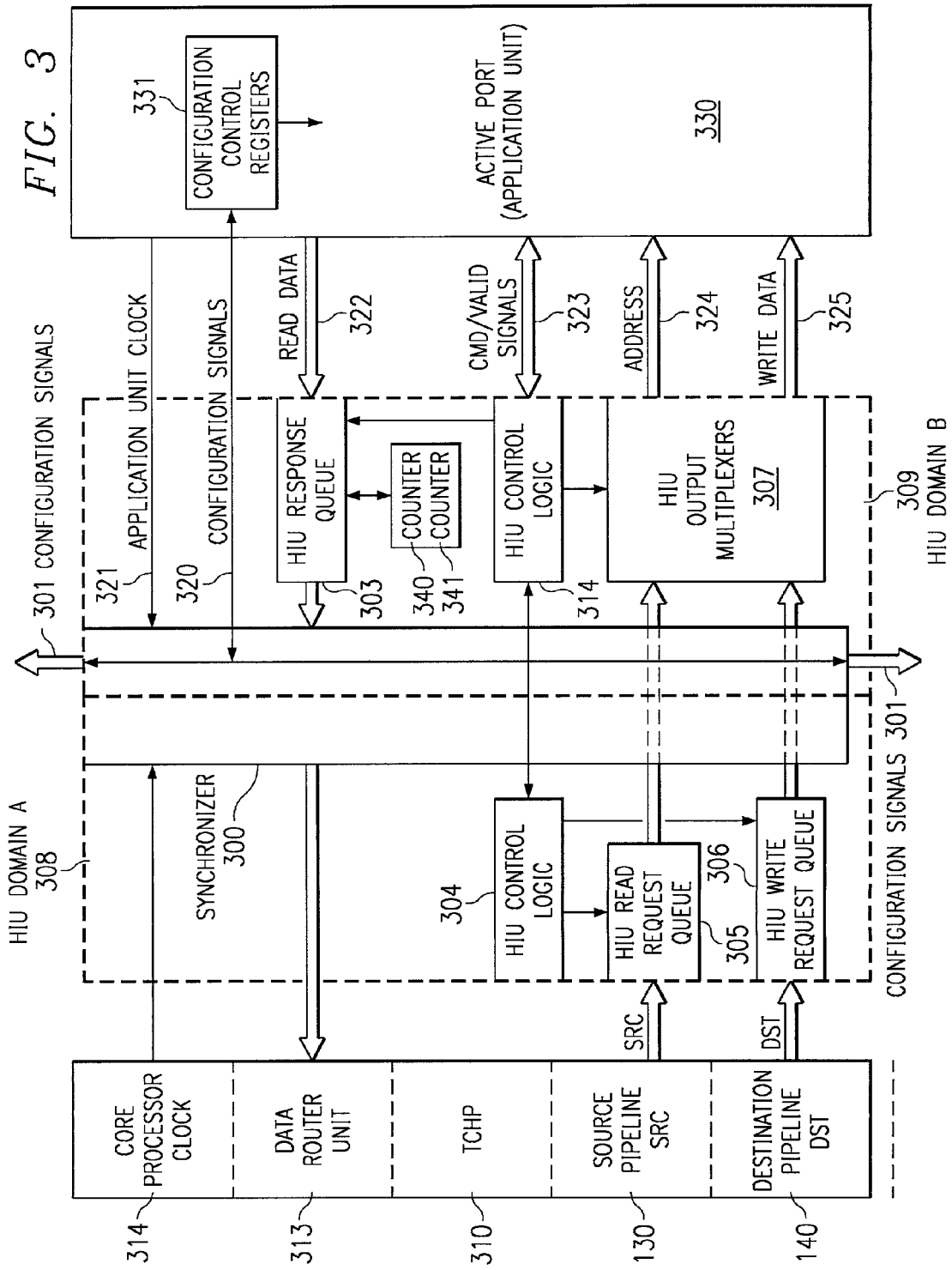
FIG. 3 illustrates a high level block diagram of the hub interface unit and its interface to the TCHP hub and the application unit or active port.

FIG. 3 illustrates a high-level block diagram of the HIU separated into two clock domains, clock domain A 308 and clock domain B 309. These two clock domains employ in this example the core processor clock 314 (clock domain A) and the application unit (AU) clock 321 (clock domain B). FIG. 3 also shows configuration signals 301 which originate from a configuration control bus and which supply configuration control data to all configurable devices including the application unit 330. Configuration operations are done prior to the actual application usage of the device. Configuration control hardware is normally dormant during normal application usage. The core functional blocks of the HIU include the HIU control logic blocks 304 and 314 split into respective clock domains A and B, HIU read request queue 305, HIU write request queue 306, HIU output multiplexers 307 and HIU response queue 303. These core functional blocks of the HIU pass data, commands and status signals (e.g. valid, acknowledge) to and from the hub on the transfer controller with hub and ports side and to and from the application unit 330 on the port side.

Commands, address and data information are sent from the hub to read request queue 305 and write request queue 306 of the HIU. The HIU control logic 304/314 processes this set of information and generates command, valid and acknowledge signals which are sent to AU 330 along with data in normal operation and configuration data during configuration cycles. Application unit 330 during read operations passes its read data, valid and acknowledge signals to the HIU.

The AU interface is a custom designed functional block which has considerable variation in its application to one kind of external peripheral interface or another. This means that the control logic of an AU may vary widely but the control signals and the interface provided by the HIU is compatible with a wide variety of custom AU requirements. The AU datapath structures also vary from one kind of peripheral interface to another.

Figure 4:
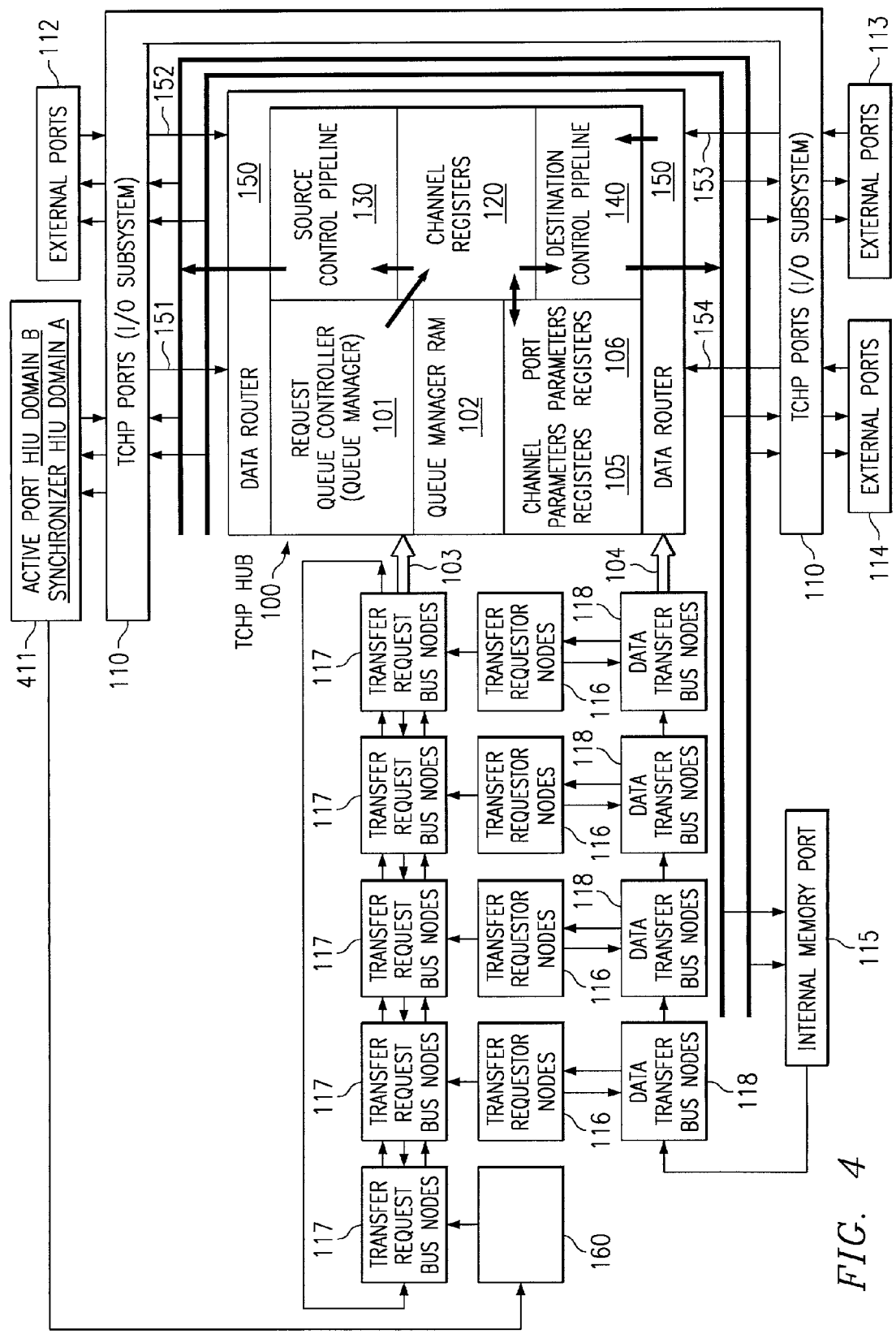
FIG. 4 illustrates the transfer controller TCHP employing one active port and showing its interface to the transfer request bus.

FIG. 4 is similar to FIG. 1 with an active port 411 replacing the external port 111 of FIG. 1. This mechanism simplifies active port integration with the transfer controller with hub and ports via the scalable transfer request TR bus interface. Note that active port 411 maintains the same basic interconnections to the transfer controller hub as the conventional external port 111 illustrated in FIG. 1. Active port 411 may initiate transfer requests just as any other transfer request node at the special transfer request node 160. Such transfer requests must specify the source, the destination and the quantity of data to be transferred. Transfer request node 160 unlike the other transfer request nodes 116 has no need of interconnection to data transfer bus 118. Data transfer in active port 411 takes place solely through the HIU and its hub interface. This interface allows active ports to directly supply both the source and destination addresses of a transaction, as well as all transfer options. Using this facility, all DMA resources of the transfer controller with hub and ports are provided to active port 411. Active port 411 may access any addressable region which the transfer controller with hub and ports can access and may use any addressing modes or special transfer options provided in the transfer controller with hub and ports.

Figure 5:
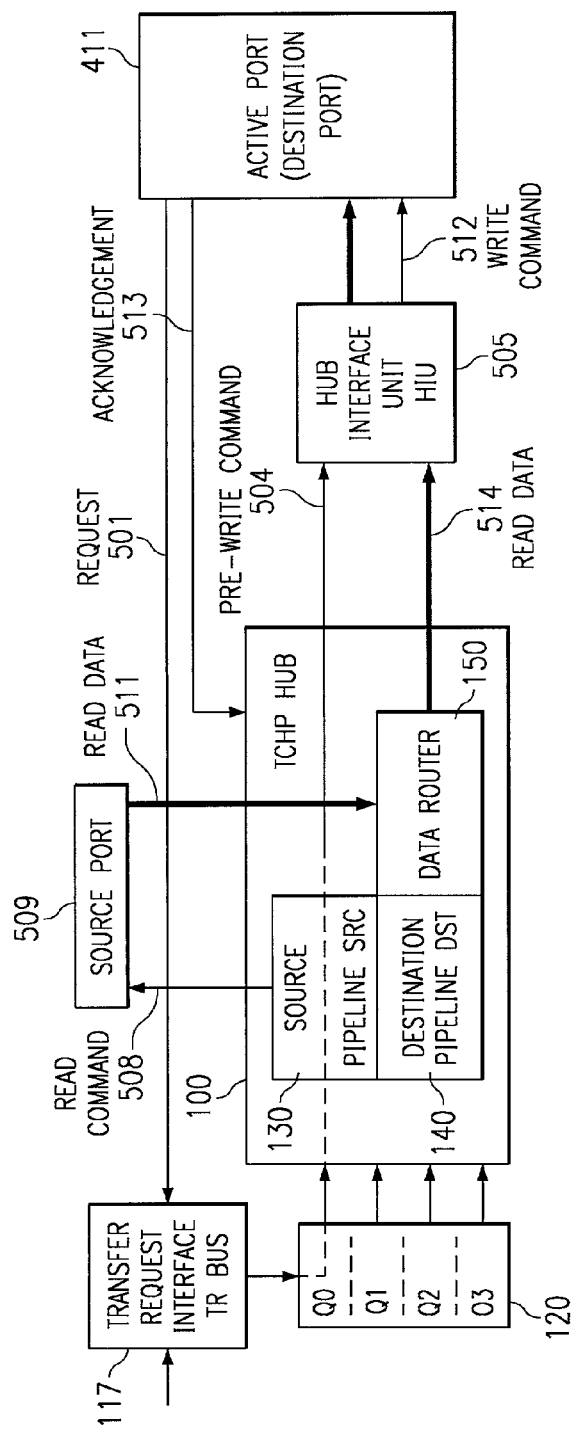
FIG. 5 illustrates the flow of command signals and data between the transfer controller hub and an active port executing an active read sequence.
Figure 6:
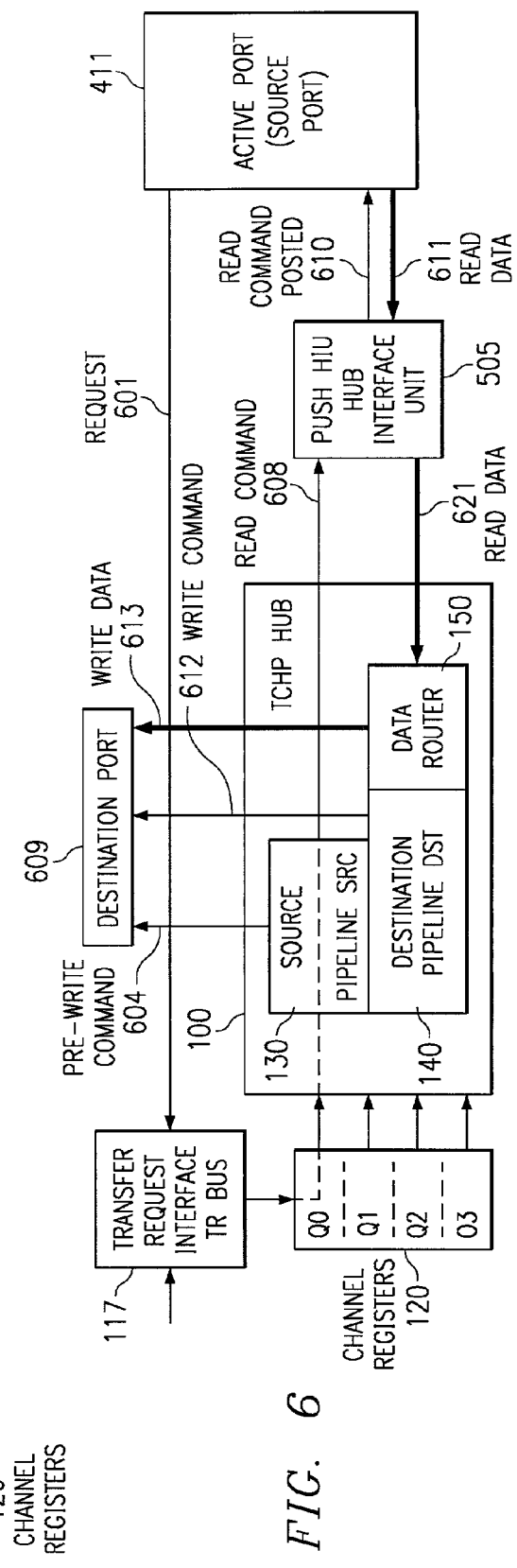
FIG. 6 illustrates the flow of command signals and data between the transfer controller hub and an active port executing an active write sequence.

FIGS. 5 and 6 illustrate the processes involved for an active read and an active write respectively. The HIU was originally designed for the conventional, more passive style port. The buffering mechanisms within the HIU are ideally suited for serving as the temporary storage facilities for active ports as described above. For example, when performing active writes, an active port can use the HIU response queue buffer 303 illustrated in FIG. 3 as the temporary storage buffer rather than implementing a separate buffer within the peripheral. Similarly, for active reads, the HIU write reservation station queue 306 illustrated in FIG. 3 provides adequate buffering such that the active port can efficiently move data as bursts throughout the system.

Note also that because the active port interfaces to an HIU as any other peripheral, the port is alleviated from concerns of the physical attributes of the addressable resource it accesses. All prioritization, pipelining and optimization of transfers for each addressable resource are provided by the transfer controller with hub and ports directly as part of its normal operation. This greatly simplifies the design and verification effort for a system including active ports and the transfer controller with hub and ports.

An active port is a peripheral or controller device that can source its own source and destination address stream for each transaction that it performs. An example of an active port in a DSP application might be an integrated PCI controller. On the pin side of the interface would be a standard PCI connection, which may be part of a larger system including other back plane devices or perhaps a host CPU. On the side of the interface internal to the device, the active port is an interface to the device transfer controller with hub and ports, which converts PCI read and write commands into device read and write commands.

A transfer might be performed somewhat as follows. The host processor wishes to transfer data from its own memory space to the DSP internal memory via the PCI bus. The host initiates this transfer by setting up its own PCI controller device to perform the transaction. The PCI controller initiates the transfer by first performing an address sub-cycle on the PCI bus directed at the DSP's PCI interface. The DSP PCI interface accepts this address sub-cycle and may optionally perform a translation or windowing function to convert this address in PCI space to the DSP memory space. The PCI peripheral will use this translated address to address the DSP internal memory space. Thus the PCI peripheral actively sources the address for a transaction.

There are two types of transfers that must be considered: an active read; and an active write. As used here the active read and write are considered from the view a device outside of the target device. That is, an active write is a write from the active port to the DSP memory space. An active read is a read of the DSP memory space by the active port. The example above is thus an example of an active write.

In an active write an address is first written into the active port. Most often this occurs from the device pins. However, it is advantageous to allow a DSP to source the address. This is desirable to eliminate certain lockup conditions. The address for an active write specifies the final destination for data that is to be written into the DSP memory space through the active port. When data is written to the active port, it must be temporarily held in a storage facility, while a request is posted to the transfer controller with hub and ports to move the data to its final destination. In this transfer request the source of the data is the internal storage space rather than an external address. When the transfer controller with hub and ports performs this access, data is read from the internal storage space and written to the final destination specified by the aforementioned address written to the active port.

FIG. 5 illustrates the flow of command signals and data between the transfer controller hub and an active port executing an active read sequence. In an active read the active port 411 is also the destination port. The transaction begins with the posting of a read data request 501 by the active port 411 through the transfer request bus 117 to the transfer controller hub 100. This request is prioritized with other TR requests and is eventually loaded into the transfer controller with hub and ports channel registers 120.

Transfer controller hub 100 issues a pre-write command 504 to the destination port HIU 505. This is the interface to the active port 411 which is also the destination port in this case, to reserve space for the landing data. Once space is reserved in the destination port, the source pipeline SRC 130 issues a read command 508 to the source port 509. Read data 511 returns from the source port 509 to data router 150. Data router 150 supplies read data 514 to active port HIU 505. Active port HIU 505 processes the command and posts a write command 512 to active port 411. Active port 411 generates an acknowledge signal 513 to complete the active read. Note that pre-write command 504 is not visible to active port 411.

FIG. 6 illustrates the flow of command signals and data between the transfer controller hub and an active port executing an active write sequence. Active port 411 begins the active write transaction with the posting of a write data request 601 through the transfer request TR interface 117 to the transfer controller hub 100. Active port 411 is also the source port in this case. This write data request 601 is prioritized with other TR requests and is eventually loaded into the transfer controller channel registers 120. A pre-write command 604 is issued by the source pipeline SRC 130 to the destination port 609 to reserve space for the landing data. Once space is reserved in the destination port, source pipeline SRC 130 issues a read command 608 to the source port 411. The HIU 505 processes the command and posts a read command 610 to active port 411. Active port 411 responds by supplying read data 611 to the HIU 505, which supplies read data 621 to data routing unit 150. Data router 150 causes destination pipeline DST 140 to supply write command 612 to destination port 609. Data router 150 can then supply write data 613 to destination port 609 via along with write command 612.

The active write is typically done from the device pins. However, it is believed necessary and desirable to allow a DSP similar loading capabilities. This address represents the address for the source data within the DSP memory space. In an active read, a transfer request is posted to the transfer controller transfer controller with hub and ports before any data sub-cycles are performed. Note that this was not the case for active writes wherein data is required to be fetched from its source address before it can be returned to the active port. In the active write transfer the destination address will typically be an internal storage facility, often necessitated for performance reasons. By allowing the data to temporarily reside in a storage buffer, the active port is allowed to insert machine stalls without the risk of losing data.

The HIU mechanism generically performs data buffering for ports in a traditional manner, where the ports are not active. For example, an external memory interface typically does not attempt to master addresses within the DSP system. Rather, such a peripheral typically just responds to normal read and write commands from the transfer controller with hub and ports. The HIU mechanism provides buffering for data and commands in such instances, allowing a higher level of performance by performing accesses as burst transactions. Thus an HIU will typically include buffering for groups of datum rather than single elements. This allows a single command to be issued for multiple pieces of data. As memory technology has progressed, it has become increasingly important to perform multiple accesses such as this to combat the lost performance mandated by the latency of an access. This is particularly the case for dynamic RAM commonly used in DSP applications. This has additionally become a requirement due to the physics of semiconductors, which often will not allow propagation of signals across even a small part of a device within a single machine cycle.

The second mechanism simplifying active port integration with the transfer controller with hub and ports architecture is its transfer request (TR) bus interface. This interface allows active ports to directly source both the source and destination addresses of a transaction, and employ all transfer options. Using this facility, all DMA resources of the transfer controller with hub and ports are provided to the active port. The active port may access any addressable region that the transfer controller with hub and ports can access and use any addressing modes or special transfer options provided in the transfer controller with hub and ports.

All prioritization, pipelining, and optimization of transfers for each addressable resource are provided by the transfer controller with hub and ports architecture directly as part of its normal operation. This greatly simplifies the design and verification effort for a system including active ports and the transfer controller with hub and ports.

FIGS. 5 and 6 illustrate the importance of noting the type of memory transactions that occur. Reads of the active port by the transfer controller with hub and ports are performed in response to active write requests by the port. Writes to the active port by the transfer controller with hub and ports are performed in response to active read requests by the port. This is a result of where the data physically resides at the point the active command is initiated. In the case of an active write the active port has the data, so the transfer controller with hub and ports must read it. In the case of an active read the data is somewhere in the DSP system memory space and must be written to the active port by the transfer controller with hub and ports. Transfers of both types may be sourced directly from the active port using the aforementioned transfer request TR interface.

This invention enables a new type of HIU called a push HIU. The push HIU is similar to the HIU described in the above mentioned U.K. Patent Application No. 9901996.9 filed Apr. 10, 1999 entitled TRANSFER CONTROLLER WITH HUB AND PORTS ARCHITECTURE, having a convention application now U.S. Pat. No. 6,496,740. A push HIU functions almost identically to a conventional HIU, processing read and write commands from the transfer controller hub and providing buffering to the peripheral side of the HIU. In a push HIU data may be pushed into the HIU from an active port before a read command is issued to the port.

From the original HIU definition, the response queue was fundamentally a FIFO. Data was written to the FIFO in response to read commands, processed by the port and read from the transfer controller with hub and ports. All read data is processed in order within the response queue, hence the FIFO definition is maintained.

A push configuration maintains the first-in-first-out order. Data is pushed into the response queue by the active port and will be read out by the transfer controller with hub and ports hub sometime later in a first-in first-out fashion. The key element to this is a modification in the way that the HIU processes read commands. In the basic HIU, a read command was placed into a command queue. The read command remained in the command queue until it could be issued to the port. The considerations for command issuance are: the order with previously issued reads; the prioritization with write commands; and the allocation of enough response queue space to provide landing space for the return data. Read commands are handled differently in a push HIU. A read command of a push HIU is the result of a request from the active port itself. Thus it can be assumed that the data is already resident in the HIU response queue. When a push HIU receives a read command from the transfer controller hub, it processes the command directly and returns data to the hub. In this case, no read command is ever issued to the port side of a push HIU.

Recall that write commands are issued to an active port through the HIU in response to active port reads. Since the active port is waiting for the data, there is no change to the original HIU mechanisms regarding writes. The HIU write reservation stations serve as temporary storage for in-flight data and allow burst writes to the active port. This is again an optimization be achieved due to the architecture of the transfer controller with hub and ports. The active port does not need to be concerned with the buffer management protocols of the HIU. Using a push HIU, the control flow of active writes is modified from that presented in FIG. 6.

Figure 7:
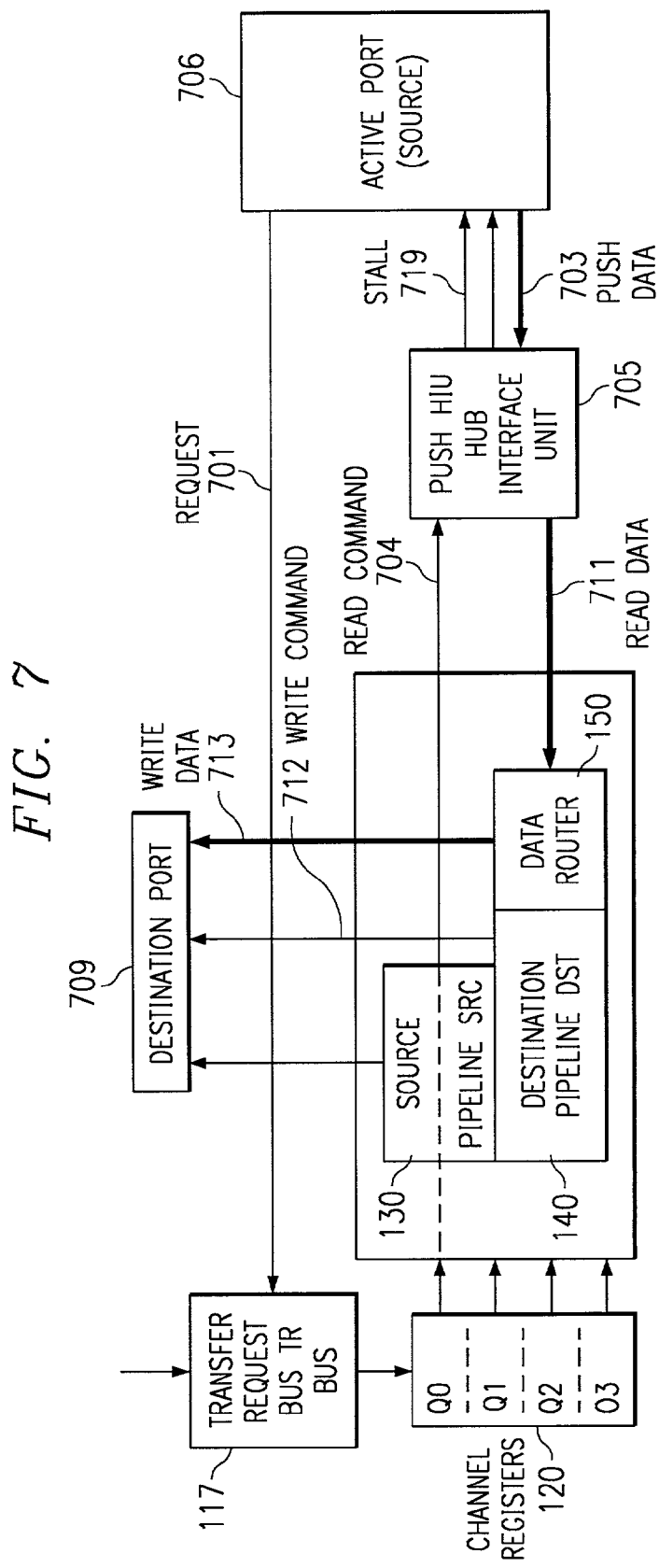
FIG. 7 illustrates the flow of command signals and data between the transfer controller hub and an active port executing an active write through a push hub interface unit.

FIG. 7 illustrates the flow of command signals and data between the transfer controller hub and an active port executing an active write through a push HIU. The transaction begins with the posting of a request 701 by the active port 706 via the TR bus 117. Push data 703 is sent to HIU interface 705 from active port 706 at this point. The transfer request packet receives normal processing, passing through queue manager RAM 101 where it is prioritized with other pending requests. During later clock cycles, this transfer request is loaded into the source pipeline SRC 130 and destination pipeline DST 140. Source pipeline SRC 130 issues a read command 704 to the active source port 706 by way of the push HIU 705, which is the active port HIU in this case. Because this HIU is a push HIU, HIU 705 intercepts the read command and processes it, returning read data 711 to the data router 150 and to destination pipeline DST 140. This corresponds to push data 703 previously pushed into HIU 705. The transfer controller with hub and ports can then routes write data 713 to destination port 709 via a write command 712. Note that read commands 704 are not visible to the active port 706 in a push configuration.

There are several key elements that the active port must provide in order to ensure proper operation. Stall conditions at push HIU 705 will prevent push write data from being accepted from active port 706. Push data should be tracked in flight to for increase performance through bursting. Active read data (HIU write data) should be tracked to perform flushes. It is important to address each of these issues and present methods for dealing with each using the transfer controller with hub and ports and HIU mechanisms.

Push HIU 705 must provide a stall signal 719 back to the active port 706 to indicate that it cannot accept push data. This signal is asserted when the response queue of push HIU 705 is full. This might occur if the transfer controller with hub and ports was unable to service the push writes fast enough. When stall signal 719 is asserted, active port 706 does not attempt any further push writes. This prevents the response queue of push HIU 705 from overflowing. This signal is straightforward and can be obtained directly from the response queue FIFO status flags. Note that for active reads, resulting in writes to the active port, no such stall condition is required since the active port is waiting for the data.

In addition to observing stall conditions of active writes, the active port can increase performance by including the provision for in flight data tracking. In flight data tracking refers to the ability to track how much data has been written into push HIU 705. The most common method is to utilize a counter maintained by the active port, which functions as follows. The response queue 303 (FIG. 3) of push HIU 705 serves as a write FIFO for active port 706. Active writes are thus tracked by a counter referred to as WR_FIFO_EL_CT counter 340 in FIG. 3. The WR_FIFO_EL_CT counter 340 increments by one for each word written to push HIU 705. Thus counter 340 tracks the number of words written to the FIFO of push HIU 705 at all times.

Several optimizations for performance may be made using counter 340. Chief among these is the ability to perform burst transfers. For example, rather than submitting an individual request for each datum word written to push HIU 705, active port 706 may wait until a number of words have been queued up reducing and ideally eliminating stall conditions. Typically, this condition can be detected by detecting a state change of the WR_FIFO_EL_CT counter 340.

In addition to provided for burst access capability, counter 340 is also particularly important in performing flush operations. A flush operation occurs when the active port stops doing writes. Note that during active operation, transfers are issued every for every M words written to the FIFO. When the active writes finally stop, there will be anywhere from 0 to N words left residing in response queue 303 of push HIU 705, and anywhere from 0 to M -1 words for which a read command has not been issued. To commit all of the active write data, it is necessary to issue a final request for any data that has not been committed. This is simple to provide by extracting the number of words not committed to memory directly from WR_FIFO_EL_CT counter 340. Upon issuing this final request, WR_FIFO_EL_CT counter 340 resets to all 0's, thus setting it up for the next active write command should it occur.

A RD_FIFO_SUB counter 341 (FIG. 3) is similar to WR_FIFO_EL_CT counter 340 and is used to gate submission of requests for bursting and during flushing. A flush during an active read happens when the port stops performing reads. When this happens, there may be data in push HIU 705 which has not been acknowledged by the port and some additional data still in flight from previously issued requests that have not made it to push HIU 705. The amount of data is between M and 2M words.

Once the read flush condition is detected, active port 706 must acknowledge off write data in the amount of RD_FIFO_SUB counter 341. This may require active port 706 to actually wait for new write commands to show up at push HIU 705, since there may be outstanding requests that have been submitted but have not yet arrived at push HIU 705. It is important that active port 706 stall any future active reads until the flush operation has been completed. This prevents corruption of the data pointers of push HIU 705.

The data for these writes is not actually important, since it represents extra data that was pre-read in anticipation that it might be used. The data can thus be discarded. Once the read flush is completed, RD_FIFO_SUB counter 341 is reset to 0, thus preparing it for the next write command.

The transfer controller with hub and ports includes several key features that make integration of an active port straightforward. The scalable TR mechanism allows multiple active ports to be used in conjunction with one another without altering the architecture of the transfer controller with hub and ports. Through the use of two simple counter mechanisms, active ports can perform memory accesses within a device using the transfer controller with hub and ports without losing data. The transfer controller with hub and ports mechanisms provide active ports the maximum performance supported, without requiring the port maintain information about the system architecture.

What is claimed is:

1. A data transfer controller comprising:
a request queue controller capable of receiving, prioritizing and dispatching data transfer requests each specifying a data source, a data destination and a data quantity to be transferred;
a data transfer hub connected to the request queue controller for receiving dispatched data transfer requests;
a plurality of data ports having an interior interface connected to the data transfer hub which is so configured as to be the same for each data port and an exterior interface configured for an external memory/device which, in operation, is connected to said data port, the interior interface and the exterior interface being connected for data transfer therebetween;
at least one transfer requestor node connected to said request queue controller and capable of supplying a data transfer request to said request queue controller;
wherein the data transfer hub being capable of controlling data transfers from a source data port corresponding to the data source to a destination data port corresponding to the data destination in quantities corresponding to the data quantities to be transferred under a currently executing data transfer request; and
wherein at least one of said plurality of data ports consists of an active data port connected to said request queue controller capable of supplying a data transfer request to said request queue controller specifying a data source, a data destination and a data quantity to be transferred.

2. The data transfer controller of claim 1, wherein:
said active data port capable of generating a data transfer request specifying said active data port as said data destination;
wherein said data transfer hub generates a read command to said data source and transfers read data to said active data port.

3. The data transfer controller of claim 2, wherein:
said data transfer hub generates a pre-write command to said active data port prior to transferring said read data to said active data port; and
said active data port generates an acknowledge signal to said data transfer hub following receipt of said pre-write command when said active data port is ready to receive data.

4. The data transfer controller of claim 1, wherein:
said active data port capable of generating a data transfer request specifying said active data port as said data source;
wherein said data transfer hub generates a read command to said active data port and transfers read data to said data destination.

5. The data transfer controller of claim 4, wherein:
said interior interface of said active data port supplies a read data command to said exterior interface of said active data port in response to read data command of said data transfer hub.

6. The data transfer controller of claim 4, wherein:
said interior interface of said active data port includes a first-in-first-out buffer;
said exterior interface writing data into said first-in-first-out buffer upon generation of said data transfer request by said active data port; and
said interior interface supplying data read from said first-in-first-out buffer upon receipt of said read command from said data transfer hub.

7. The data transfer controller of claim 6, wherein:
said interior interface of said active data port generates a stall signal to said exterior interface of said active data port when said first-in-first-out buffer is full; and
said exterior interface refrains from writing data into said first-in-first-out buffer upon receipt of said stall signal.

8. A method of data transfer comprising the steps of:
generating via at least one transfer requestor node data transfer requests each specifying a data source, a data destination and a data quantity to be transferred;
receiving, prioritizing and dispatching data transfer requests;
transferring data from a source data port selected from a plurality of data ports corresponding to the data source specified in a data transfer request to a destination data port selected from said plurality of data ports corresponding to the data destination specified in the data transfer request in quantities corresponding to the data quantities to be transferred specified in the data transfer request under a currently executing data transfer request;
wherein at least one of said plurality of data ports is an active data port; and
generating a data transfer request at an active data port specifying a data source, a data destination and a data quantity to be transferred.

9. The method of data transfer of claim 8, wherein:
generating a data transfer request at an active data port specifying said active data port as said data destination.

10. The method data transfer of claim 9, further comprising the steps of:
supplying a pre-write command to said active data port prior to transferring said read data to said active data port; and
supplying an acknowledge signal from said active data port following receipt of said pre-write command when said active data port is ready to receive data.

11. The method of data transfer of claim 8, wherein:
generating a data transfer request at an active data port specifying said active data port as said data source.

12. The method of data transfer of claim 11, further comprising the steps of:
writing data into a first-in-first-out buffer upon generation of said data transfer request by said active data port; and
supplying data read from said first-in-first-out buffer upon receipt of a read command by from said active data port.

13. The method of data transfer of claim 12, further comprising the steps of:
generating a stall signal when said first-in-first-out buffer is full; and
refraining from writing data into said first-in-first-out buffer upon generation of said stall signal.

14. The data transfer controller of claim 1, further comprising:
a plurality of transfer request nodes disposed in a chain having an upstream most node and a downstream most node, said downstream node connected to said request queue controller;
a plurality of transfer requestor nodes each capable of generating service requests and each connected to a corresponding one of said plurality of transfer request nodes; and
a special transfer request node connected to said upstream most node of said plurality of transfer request nodes and said active data port, said special transfer request node connecting said active data port to said request queue controller via said plurality of transfer request nodes.

15. The method of data transfer of claim 8, wherein:

said step of receiving, prioritizing and dispatching data transfer requests is performed by a request queue controller;

further comprising the steps of:

transferring data transfer requests from each of a plurality of transfer requestor nodes to said request queue controller via a chain of a plurality of transfer request nodes having an upstream most node and a downstream most node, said downstream node connected to said request queue controller; and transferring data transfer requests from said active data port to said request queue controller via a special transfer request node connected to said upstream most transfer request node.

* * * * *